US008569424B2

(12) United States Patent
Vogel et al.

(10) Patent No.: US 8,569,424 B2
(45) Date of Patent: Oct. 29, 2013

(54) BROMINATED AND EPOXIDIZED FLAME RETARDANTS

(75) Inventors: Erin B. Vogel, Midland, MI (US); Shari L. Kram, Midland, MI (US); Daniel J. Murray, Midland, MI (US); Bruce A. King, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 421 days.

(21) Appl. No.: 12/825,591

(22) Filed: Jun. 29, 2010

(65) Prior Publication Data

US 2010/0331497 A1    Dec. 30, 2010

Related U.S. Application Data

(60) Provisional application No. 61/222,069, filed on Jun. 30, 2009.

(51) Int. Cl.
    *C08F 8/18*    (2006.01)
(52) U.S. Cl.
    USPC ..................... 525/332.3; 525/331.9
(58) Field of Classification Search
    USPC ........................... 525/332.3, 331.9
    See application file for complete search history.

(56) References Cited

U.S. PATENT DOCUMENTS

| 4,588,778 | A * | 5/1986 | Nir et al. ................. 525/115 |
| 2008/0064774 | A1 | 3/2008 | Stobby |
| 2008/0287559 | A1 | 11/2008 | King et al. |
| 2009/0292079 | A1 | 11/2009 | Murray et al. |
| 2010/0004402 | A1 | 1/2010 | King et al. |
| 2010/0317757 | A1 | 12/2010 | King |
| 2011/0240906 | A1 | 10/2011 | Kram et al. |

FOREIGN PATENT DOCUMENTS

| WO | 2007058736 A | 5/2007 |
| WO | 2008021417 A | 2/2008 |
| WO | 2008021418 A | 2/2008 |
| WO | 2009108453 A | 9/2009 |
| WO | 2010080285 A | 7/2010 |

OTHER PUBLICATIONS

Nae et al., "Epoxidation of Bromostyrene-Butadiene Cotelomers", J. Polym. Sci. A: Polym. Chemistry 24 (1986) 1239-1249.

* cited by examiner

*Primary Examiner* — Edward Cain
(74) *Attorney, Agent, or Firm* — Gary C Cohn PLLC

(57) ABSTRACT

Brominated and epoxidized organic compounds are useful flame retardants for polymers such as polystyrene. The organic compounds contain both bromine and oxirane groups, and have molecular weights of at least 1500. The brominated and epoxidized organic compounds can be prepared by sequentially brominating and epoxiding (in either order) a starting compound that contains multiple non-conjugated carbon-carbon double bonds.

17 Claims, No Drawings

US 8,569,424 B2

BROMINATED AND EPOXIDIZED FLAME RETARDANTS

CROSS-REFERENCE TO RELATED APPLICATION

This application claims priority from U.S. Provisional Patent Application No. 61/222,069, filed 30 Jun. 2009.

BACKGROUND OF THE INVENTION

The present invention relates to brominated and epoxidized compounds and to the use thereof as flame retardants for organic polymers such as polymers and copolymers of styrene. The invention also relates to certain processes for preparing brominated and epoxidized compounds.

Brominated compounds such as hexabromocyclododecane are commonly used as flame retardant (FR) additives for various polymer systems. FR additives improve the performance of polymer systems in standard fire tests. Because hexabromocyclododecane is under regulatory and public pressure that may lead to restrictions on its use, there is an incentive to find a replacement for it.

Among the candidates for replacing hexabromocyclododecane are higher molecular weight (1500 or greater) brominated compounds and polymers. The higher molecular weight of these materials tends to greatly restrict their bioavailability, and for that reason these materials are not expected to bioaccumulate.

Most organic polymers are made into useful products via some melt-processing operation in which the polymer is subjected to temperatures that are high enough to melt it. In many polymer melt processing operations, the FR additive may be exposed to temperatures of 200 to 250° C. or higher. The FR additive must possess sufficient thermal stability to undergo very little, if any, thermal degradation when subjected to those melt processing conditions.

Brominated FR additives are believed to function by evolving HBr when the additive is exposed to temperatures in excess of about 300° C. Unfortunately, HBr tends to evolve even at temperatures as low as 180° C. in some cases. The HBr that evolves tends to catalyze the evolution of more HBr as well as other unwanted reactions such as cross-linking, which can lead to gel formation. Even a small amount of HBr evolution can be a significant problem, due to the auto-catalytic effect that the liberated HBr has on the system.

For this reason, polymer systems that contain brominated FR additives often contain an HBr scavenger. Epoxide compounds are commonly used for this purpose. However, this requires an additional material to be compounded into the organic polymer, which adds raw material costs and often adds additional compounding costs.

Another problem is that the epoxide additives may perform less effectively as higher molecular weight brominated FR agents replace hexabromocyclododecane. This may be due to solubility issues. Higher molecular weight brominated FR additives are often significantly less soluble in the organic polymer matrix than is hexabromocyclododecane. For example, one potential replacement of interest, a brominated butadiene-styrene copolymer, tends to disperse in polystyrene in the form of small but discrete particles. The epoxide compound, on the other hand, usually is soluble in the polystyrene phase. It may for that reason partition between the polystyrene and brominate copolymer phases. The portion of the epoxide compound which partitions into the polystyrene is not in intimate contact with the FR additive and may function less effectively for that reason.

SUMMARY OF THE INVENTION

The present invention is in one aspect a brominated and epoxidized organic compound having a molecular weight of at least 1500, a bromine content of at least 35% by weight and at least one oxirane group per molecule, and which has a 5% weight loss temperature of at least 180° C.

The invention is also an organic polymer composition comprising an organic polymer having dissolved or dispersed therein an amount of the brominated and epoxidized organic compound sufficient to impart to the composition at least 0.1 part by weight of bromine per 100 parts by weight of the organic polymer composition.

The invention is also a process for preparing a brominated and epoxidized organic compound, comprising (a) brominating a starting compound that has a molecular weight of at least 700 and multiple non-conjugated carbon-carbon double bonds such at least one but less than all of the non-conjugated carbon-carbon double bonds are brominated and the brominated starting compound contains at least 35% by weight bromine, and then (b) epoxidizing at least one remaining non-conjugated carbon-carbon double bond.

The invention is also a process for preparing a brominated and epoxidized organic compound, comprising (a) epoxidizing a starting compound that has a molecular weight of at least 700 and multiple non-conjugated carbon-carbon double bonds such at least one but less than all of the non-conjugated carbon-carbon double bonds is epoxidized and then (b) brominating at least a portion of the remaining non-conjugated carbon-carbon double bonds by contacting the compound with a quaternary ammonium tribromide or quaternary phosphonium tribromide, to produce an brominated and epoxidized organic compound that has a molecular weight of at least 1500 and contains at least 35% by weight bromine.

This invention is also a process for preparing a brominated and epoxidized organic compound, comprising (a) brominating a starting unsaturated compound that contains both internal non-conjugated carbon-carbon double bonds and terminal non-conjugated carbon-carbon double bonds until at least 90% of the internal carbon-carbon double bonds are brominated but no more than 90% of the terminal carbon-carbon double bonds are brominated and (b) epoxidizing at least a portion of the remaining terminal carbon-carbon double bonds, to provide a brominated and epoxidized organic compound that contains at least 35% by weight bromine and from 0.1 to 5 weight percent of oxirane oxygen.

This invention is also a process for preparing a brominated and epoxidized butadiene polymer, comprising (a) brominating a starting butadiene polymer having a molecular weight of at least 700 and which has both 1,4-butadiene units and 1,2-butadiene units, such that at least 90% of the 1,4-butadiene units are brominated and at most 90% of the 1,2-butadiene units are brominated; and then (b) epoxidizing at least one of the remaining unbrominated 1,2-butadiene units to form a brominated and epoxidized butadiene polymer.

The brominated and epoxidized organic compound is an effective flame retardant for a variety of bulk polymers. It tends to show excellent thermal stability during melt processing operations, as indicated by 5% weight loss temperatures and 230° onset times, as described more fully below.

In addition to functioning as HBr scavengers, the epoxide groups on the brominated and epoxidized organic compound represent functional groups at which various chemical reactions can be performed. This potentially permits the brominated and epoxidized organic compound to be grafted onto other polymers and molecules, and permits further functionalization of the material through one or more reactions at the site of the oxirane ring(s). The brominated and epoxidized organic compound can be crosslinked through contact with an epoxy curing agent such as a polyamine. This permits, for example, the brominated and epoxidized organic compound to be dispersed in a bulk polymer and then crosslinked to form discrete particles having a predetermined size range. This crosslinking and particle formation can make the material more resistant to gel formation due to the elimination of HBr and subsequent HBr-catalyzed reactions.

DETAILED DESCRIPTION OF THE INVENTION

The brominated and epoxidized organic compound of the invention is characterized in having a molecular weight of at least 1500. The molecular weight is preferably at least 2000, and may be at least 5000, at least 10,000 or at least 20,000. The molecular weight may be as high as 500,000 or as high as 200,000, but is preferably not higher than 100,000 and still more preferably not higher than 85,000. For purposes of this invention, molecular weights of about 2,000 or higher are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

The brominated and epoxidized organic compound is "brominated", by which it is simply meant that the compound contains bromine atoms, irrespective of how those bromine atoms are introduced onto the compound. The bromine atoms are preferably bonded directly to aliphatic carbon atoms, and even more preferably to primary and/or secondary aliphatic carbon atoms (i.e., carbon atoms that are bonded to no more than 2 other carbon atoms). Preferably, fewer than 5%, more preferably fewer than 2% and still more preferably no more than 1% of the bromine is bonded to allylic or tertiary carbon atoms. There should be little or no hydrobromination. The brominated and epoxidized organic compound has a bromine content of at least 35% by weight. Higher bromine contents are generally preferred as higher bromine content materials can be used in smaller quantities to provide an equivalent bromine content in an organic polymer composition The bromine content may be at least 40%, at least 50%, or at least 60%, and can be as high as 70% or even 75% by weight.

The brominated and epoxidized organic compound is "epoxidized", by which it is meant that the compound contains at least one oxirane group, irrespective of how the oxirane group(s) are introduced onto the compound. The brominated and epoxidized organic compound preferably has more than one oxirane group. The brominated and epoxidized organic compound may contain at least 0.1, preferably at least 0.5 weight percent of oxirane oxygen, up to as much as 5 percent, preferably up to 3 percent of oxirane oxygen.

The brominated and epoxidized organic compound should be thermally stable, and, accordingly, should not contain structures which cause the compound to degrade or decompose significantly at temperatures below 180° C. The brominated and epoxidized organic compound is preferably free of metal and semi-metal atoms. A preferred brominated and epoxidized organic compound contains the elements carbon, hydrogen, oxygen, bromine and optionally nitrogen and chlorine, with all other elements each constituting at most 1% of the total weight of the compound. More preferably, the brominated and epoxidized organic compound contains carbon, hydrogen, oxygen and bromine, with all other elements each constituting at most 1% of the total weight of the compound.

Thermal stability of the brominated and epoxidized organic compound is determined, for purposes of the invention, by evaluation of a 5% weight loss temperature. 5% weight loss temperature is evaluated by thermogravimetric analysis, using the following or equivalent method. 10 milligrams of the compound are analyzed using a TA Instruments model Hi-Res TGA 2950 or equivalent device, with a 60 milliliters per minute (mL/min) flow of gaseous nitrogen and a heating rate of 10° C./min, over a range from room temperature (nominally 25° C.) to 600° C. The mass lost by the sample is monitored during the heating step, and the temperature at which the sample has lost 5% of its initial weight is designated the 5% weight loss temperature (5% WLT). Weight losses that occur at about 100° C. or below are generally ignored, as those losses reflect the volatilization or residual solvents or other impurities, rather than a degradation of the brominated and epoxidized organic compound. The 5% weight loss temperature of the brominated and epoxidized organic compound by this test should be at least 180° C., preferably is at least 200° C. and more preferably is at least 240° C.

At least some of the epoxide group(s) on the brominated and epoxidized organic compound preferably are terminal rather than internal types. "Terminal" epoxides have the structure

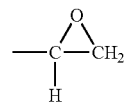

and thus represent a terminal group on the compound, whereas, "internal" epoxides have the structure

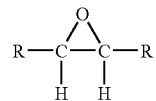

wherein the R groups each are something other than hydrogen, typically an organic group having a carbon atom that is bonded to the adjacent oxirane carbon. The terminal epoxides have unexpectedly been found to have better thermal stability than the internal types. Therefore, it is preferred that at least some, and preferably substantially all, of the epoxide groups are terminal epoxides.

Brominated and epoxidized organic compounds are conveniently formed from starting materials that have multiple (i.e., two or more, preferably 3 or more) non-conjugated carbon-carbon double bonds. Double bonds of these types can be subjected to bromination (i.e., the addition of two bromine atoms across the double bond) and epoxidation (i.e., the addition of an oxygen atom across the double bond to form an oxirane ring at the site of the double bond). The starting material has a molecular weight of at least 700, preferably at least 1000.

Preferred starting compounds contain either solely terminal nonconjugated carbon-carbon double bonds (i.e., —CH=CH$_2$) or both terminal and internal carbon-carbon double bonds (i.e., —CH=CHR¹, where R¹ is an organic radical). The presence of terminal carbon-carbon double bonds permits terminal epoxide groups to be introduced easily. If the starting compound contains both types of unsaturation, it is preferred that at least 10%, more preferably at least 50%, up to 99%, more preferably up to 80%, of the carbon-carbon double bonds are the terminal types. However, it is within the scope of the invention to produce the brominated and epoxidized organic compound of the invention from an unsaturated starting compound that contains only internal carbon-carbon double bonds or only terminal carbon-carbon double bonds.

Starting compounds that are readily available and relatively inexpensive include polymers and copolymers of a conjugated diene monomer, preferably butadiene, and certain fatty acid esters.

Suitable polymers and copolymers of conjugated diene monomers contain at least 30%, more preferably at least 50%, by weight of polymerized conjugated diene units. Polymers and copolymers of butadiene are preferred among these. Butadiene homopolymers and styrene/butadiene copolymers (especially block copolymers) are of particular interest. Butadiene homopolymers and styrene/butadiene diblock and triblock copolymers are most preferred. A butadiene polymer or copolymer may also contain repeating units formed by polymerizing monomers other than the conjugated diene monomer and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the vinyl aromatic monomer and/or butadiene, may be polymerized to form blocks, or may be grafted onto the polymer.

Suitable polymers and copolymers of a conjugated diene monomer preferably have a weight average molecular weight ($M_w$) within a range of from 1,000 to 400,000, preferably from 2,000 to 300,000, more preferably from 5,000 to 200,000, even more preferably from 20,000 to 120,000 and still more preferably from 20,000 to 50,000.

Butadiene homopolymers and copolymers are examples of starting materials which contain both internal and terminal types of carbon-carbon double bonds. Butadiene polymerizes to form mainly two types of repeating units. One type, referred to herein as "1,2-butadiene units" takes the form

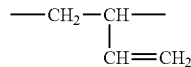

and so introduces terminal unsaturated groups to the polymer. The second type, referred to herein as "1,4-butadiene" units, takes the form —CH₂—CH=CH—CH₂—, and so introduces the internal type of unsaturation into the main polymer chain. Most commercially available butadiene polymers, including most commercially available polybutadiene homopolymers and styrene/butadiene block copolymers, tend to have both types of butadiene units in varying proportions. It is preferred that at least 10%, more preferably at least 50%, up to 99%, more preferably up to 80%, of the butadiene repeating units in the polymer or copolymer are the 1,2-butadiene units.

Fatty acid esters that are useful as starting materials are esters of unsaturated fatty acids or a fatty acid mixture that contains one or more unsaturated fatty acids, and a polyol having two or more, preferably three or more, hydroxyl groups per molecule. The molecular weight of the fatty acid ester is preferably at least 700 and more preferably at least 850, so a molecular weight of 1500 or greater is attained after bromination and epoxidation. The fatty acid esters will contain an average of at least two, preferably at least 2.5 and still more preferably at least 3 nonconjugated carbon-carbon double bonds per molecule.

By "fatty acid", it is meant a straight-chain monocarboxylic acid that contains a chain of from 12 to 30 carbon atoms, including the carbonyl carbon of the carboxylic acid group. The fatty acid preferably contains from 12 to 24 carbon atoms, and more preferably contains from 14 to 20 carbon atoms. An "unsaturated fatty acid" in addition contains at least one carbon-carbon double bond. The fatty acids are preferably, for reasons of cost and availability, a mixture of fatty acids as obtained from a vegetable oil or animal fat, or a mixture of two or more vegetable oils and/or animal fats.

Fatty acid triglycerides are suitable starting materials, provided that at least a portion of the constituent fatty acids are unsaturated. Vegetable oils and animal fats are naturally-occurring fatty acid triglycerides, many of which are readily available and relatively inexpensive. These vegetable oils and animal fats are useful starting materials, provided that they have enough of the necessary unsaturation. Vegetable oils are preferred among these on the basis of greater availability and lower cost. Sunflower, soy, corn, canola, olive, linseed, tung and other unsaturated vegetable oils are all suitable starting materials.

Vegetable oils and animal fats that have been modified by interesterification of two or more starting vegetable oils and/or animal fats are also useful starting materials.

Other fatty acid esters which are useful starting materials include esters of one or more sugars with from 5 to 16, preferably from 5 to 12 and still more preferably from 5 to 8 moles of one or more fatty acids per mole of sugar. By "sugar", it is meant a monosaccharide, disaccharide or oligosaccharide, which, prior to being esterified, contains from 5 to 16, more preferably from 5 to 12, and even more preferably from 5 to 8 hydroxyl groups per molecule. Disaccharides such as sucrose, lactose, maltose and trehalose are preferred sugars, with sucrose being especially preferred on the basis of its ready availability and low cost. Mixtures of sugars can be used if desired. Commercially available esters of this type are available from P&G Chemicals under the product designations Sefose® 1618UC unhardened soyate, Sefose® 2275C behenate.

Another suitable type of ester starting material is an ester of a polyol (other than glycerin) having at least 3, preferably at least 4 hydroxyl groups and at least three moles of one or more fatty acids (as defined before) per mole of polyol. As before, such esters contain at least two sites of carbon-carbon unsaturation. As before, the fatty acids are preferably a mixture of fatty acids as obtained from a vegetable oil or animal fat, or a mixture of two or more vegetable oils and/or animal fats.

The brominated and epoxidized organic compound of the invention can be prepared from a starting ethylenically unsaturated compound by sequentially brominating and epoxidizing non-conjugated carbon-carbon double bonds in the starting compound. In either case, only a portion of the unsaturation is consumed in a first step, leaving residual unsaturation that is epoxidized or brominated, as the case may be, in a second reaction. It is possible to conduct the bromination and epoxidation reactions in either order, although in some cases it is preferred to brominate before epoxidizing, and, if epoxidation is performed first, certain bromination techniques are to be avoided. It is preferred that at least 90%, more preferably at least 95% and still more preferably at least 98% of the non-conjugated carbon-carbon bonds in the starting compound have been either brominated or epoxidized, after the bromination and epoxidation steps have been completed.

It is preferred to conduct the bromination before the epoxidation in cases where the starting compound contains both internal and terminal non-conjugated carbon-carbon double bonds and it is desired to selectively epoxidize the terminal double bonds. This produces mainly or even exclusively terminal epoxide groups, which, as explained before, are believed to be more thermally stable than internal epoxides. Therefore, a preferred process for preparing a brominated and epoxidized organic compound of the invention includes a first step of brominating a starting unsaturated compound that contains both types of carbon-carbon double bonds until at least 90%, more preferably at least 95% and still more preferably at least 98% of the internal carbon-carbon double bonds are brominated, but no more than 90%, preferably no more than 80% and still more preferably no more than 70% of the terminal carbon-carbon double bonds are brominated. In a second step, at least a portion of the remaining terminal carbon-carbon double bonds are epoxidized, so that the brominated and epoxidized organic compound contains from 0.1 to 5, preferably from 0.5 to 3, weight percent of oxirane oxygen. As before, it is preferred that at least 90, more preferably at least 95 and still more preferably at least 98% of the non-conjugated carbon-carbon bonds in the starting compound have been either brominated or epoxidized, after the epoxidation step is completed.

Thus, for example, a preferred method for brominating and epoxidizing a polymer or copolymer of butadiene is to brominate it first, followed by epoxidation. The 1,4-butadiene units in the starting polymer brominate easily during the bromination reaction. It is possible to brominate essentially all of the 1,4-butadiene units without brominating all of the 1,2-butadiene units. Typically, at least some of the 1,2-butadiene units also will become brominated during the bromination step, but, unless stringent conditions are used, or the bromination is continued for an extended time period, some of the 1,2-butadiene units will remain unbrominated. The amount of unbrominated 1,2-butadiene units can be controlled through control of process conditions and bromination times. In the preferred method, 1,2-butadiene units that remain in the brominated butadiene polymer are then epoxidized. This process produces a product in which most if not all of the epoxidation occurs at 1,2-butadiene units. Butadiene polymers brominated and epoxidized in this way have been found to be more thermally stable than those in which epoxidation occurs largely or solely at 1,4-butadiene units.

When the starting compound contains only internal carbon-carbon double bonds, or contains only terminal carbon-carbon double bonds, the bromination and epoxidation may be performed in either order, although certain brominating agents should be avoided if the bromination is performed last.

The bromination reaction is conducted by contacting the starting compound (or epoxidized starting compound) with a brominating agent, under conditions sufficient to brominate the desired proportion of the non-conjugated carbon-carbon double bonds in the starting material. Mild bromination methods, which are selective towards brominating the nonconjugated carbon-carbon double bonds in the starting compound, are preferred. The bromination process should not significantly brominate aromatic rings as may be present in the starting material. In addition, the bromination process preferably does not introduce a significant amount of bromine onto tertiary or allylic carbon atoms that may be present in the starting compound.

Two particularly suitable classes of brominating agents are (1) elemental bromine and (2) quaternary ammonium or phosphonium tribromides. Either of these brominating agents can be used when the bromination is performed before the epoxidation. However, if bromination is performed after epoxidation (or on an epoxidized starting material), then the quaternary ammonium or phosphonium tribromides are strongly preferred. Elemental bromine can react with an oxirane group to form the corresponding hydrobromide, which is undesired.

A suitable method for brominating the unsaturated starting compound with elemental bromine is described in WO 2008/021418. An aliphatic alcohol may be present during the bromination reaction, also as described in WO 2008/021418. Residual bromine and other by-products can be removed from the brominated product by extraction, washing, or other useful methods. As mentioned, a bromination using elemental bromine as the brominating agent is useful if the starting compound is brominated prior to epoxidation. Once the starting compound is epoxidized, this method is not preferred because the elemental bromine can add easily to the oxirane ring to form a hydrobromide.

Suitable methods for brominating an unsaturated starting material with a quaternary ammonium tribromide or a quaternary phosphonium tribromide are described, for example, in WO 2008/021417 and in U.S. Provisional Patent Application No. 61/090,054, filed 22 Aug. 2008. Pyridinium tribromide, phenyltrialkylammonium tribromides, benzyltrialkylammonium tribromides and tetraalkylammonium tribromides are suitable quaternary ammonium tribromides. Specific examples include phenyltrimethylammonium tribromide, benzyltrimethylammonium tribromide, tetramethylammonium tribromide, tetraethylammonium tribromide, tetrapropylammonium tribromide, tetra-n-butylammonium tribromide and the like.

Suitable quaternary phosphonium tribromides contain a quaternary phosphonium group that can be represented by the formula $R_4P^+$, where each R is a hydrocarbon group. The quaternary phosphonium tribromide may be a tetraalkylphosphonium tribromide, in which case each of the R groups is alkyl. The four R groups can all be the same. Alternatively, there may two, three or even four different R groups attached to the phosphorus atom. The R groups each are preferably alkyl groups having from one to 20 carbon atoms. The R groups more preferably are alkyl groups having from 1 to 8 carbon atoms. Examples of specific quaternary phosphonium tribromides include tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, trihexyltetradecylphosphonium tribromide, and the like, or mixtures thereof.

The quaternary ammonium or phosphonium tribromide brominating agent can be prepared by mixing the corresponding quaternary ammonium or phosphonium monobromide salt with elemental bromine. The monobromide salt is usually water-soluble, so a convenient way of making the tribromide is to add elemental bromine to an aqueous solution of the monobromide salt. This reaction proceeds well at approximately room temperature, but higher or lower temperatures can be used if desired. The tribromide tends to precipitate from the aqueous phase, and so may be recovered from the liquid phase by any convenient solid-liquid separation method. Because the quaternary ammonium or phosphonium tribromide is soluble in many organic solvents, it can be separated from the aqueous phase by extraction with an organic solvent to form a solution of the quaternary ammonium or phosphonium tribromide in the organic solvent. The tribromide may be dissolved in such a solvent if desired to facilitate the addition of the tribromide into the reaction mixture.

Generally, only mild conditions are needed to effect the bromination. Bromination temperatures can range from −20 to 100° C., and are preferably from 0 to 85° C. Temperatures higher than 100° C. could be used, but are not necessary and may lead to a loss of selectivity and/or an increase in byproducts. A quaternary ammonium or phosphonium tribromide brominating agent becomes converted to the corresponding quaternary ammonium or phosphonium monobromide salt as the reaction proceeds, when such tribromides are selected as the brominating agent.

The time of the reaction is sufficient to achieve the desired amount of bromination. The bromination is continued until a bromine content of at least 35% is achieved. When bromination is performed before epoxidation, care is taken to prevent complete bromination of all non-conjugated carbon-carbon double bonds, so that some remain for epoxidation. Typically, bromination occurs on at least 25%, preferably, at least 50% and more preferably at least 70% of the non-conjugated carbon-carbon double bonds on the starting material. Up to 90% or up to 95% of the non-conjugated carbon-carbon bonds may be brominated. The extent of bromination often can be determined using proton NMR methods.

The bromination may be performed in a solvent, especially when the starting compound is a solid at the temperature of the bromination reaction or is a viscous liquid under those conditions. Suitable solvents include ethers such as tetrahydrofuran; halogenated alkanes such as carbon tetrachloride, chloroform, dibromomethane, dichloromethane and 1,2-dichloroethane; hydrocarbons such as cyclohexane and toluene, and halogenated aromatic compounds such as bromobenzene, chlorobenzene and dichlorobenzene. A preferred type of solvent is one which is a liquid under the bromination conditions and which does not undesirably react with the brominating agent or starting compound. The preferred solvents are preferably aprotic and are not oxygenated, as oxygen-containing solvents can engage in addition reactions across aliphatic carbon-carbon double bonds, leading to a deterioration of the thermal properties of the product. Halogenated and hydrocarbon solvents are therefore preferred over oxygen-containing solvents. It has been found that halogen exchange reactions do not occur to a significant extent when mild reaction conditions are used, and for that reason chlorinated solvents are very suitable for use in the invention.

Following the bromination reaction, the brominated material may be recovered from any solvent that is used, and the isolated material may be purified to remove residual bromine, brominating agent, solvent and by-products as desired or needed for a particular application. Bromide salts may be removed by passing the material through silica gel or an ion exchange resin bed. The brominated material may be washed with a base and/or reducing agent, such as an aqueous alkali metal bicarbonate and/or alkali metal hydrogen sulfite solution, to neutralize or quench unreacted brominating agent that may be present. This effectively removes or eliminates any orange color that may be present in the brominated material due to residual bromine or bromine compounds.

The brominated compound may be treated with an alkali metal base in order to further increase its thermal stability. The alkali metal base may be, for example, a hydroxide or a carbonate. The alkali metal base is preferably an alkali metal alkoxide. The alkali metal can be lithium, sodium, potassium or cesium. Lithium, sodium and potassium are preferred. The alkoxide ion can contain from 1 to 8, preferably from 1 to 4, carbon atoms, with methoxide and ethoxide being especially preferred. Especially preferred alkali metal alkoxides are lithium methoxide, sodium methoxide, potassium methoxide, lithium ethoxide, sodium ethoxide and potassium ethoxide. The temperature during the alkali metal base treatment can be, for example, from −10° C. to 100° C., and is preferably from about 10° C. to about 60° C. The alkali metal base needs only to be in contact with the brominated material for a short period of time, typically on the order of a few minutes or even less, to be effective.

Epoxidation can be performed by contacting the starting organic compound or the brominated organic compound with an oxidizing agent which oxidizes nonconjugated carbon-carbon double bonds to form oxiranes. Suitable oxidizing agents include various peroxides, peracids and peresters such as hydrogen peroxide, peracetic acid, sodium acetate/peracetic acid mixtures, and meta-chloroperbenzoic acid. An excess of oxidizing agent may be used over that amount needed to epoxidized the desired number of carbon-carbon double bonds. The epoxidation reaction may be catalyzed using various metallic catalysts such as Venturello's (tungsten) catalyst, as described in U.S. Pat. No. 5,274,140 and *J. Org. Chem.* 1988, 53, 1553-1557. Venturello's catalyst is particularly useful for use with hydrogen peroxide as the oxidizing agent. The epoxidation reaction is preferably carried out under mild temperature conditions; from −20 to 100° C. is a preferred range, although the reaction can be carried out at higher or lower temperatures if desired. The particular temperature used may depend somewhat on the particular oxidant that is used and the catalyst, if any. The epoxidation reaction is conducted until the brominated and epoxidized organic compound contains at least 0.1, preferably at least 0.5 weight percent oxirane oxygen. The reaction may continue until the brominated and epoxidized organic compound contains up to 5 weight percent oxirane oxygen.

After the epoxidation reaction is completed, it is preferred to treat the epoxidized material with a mild base or reducing agent, such as sodium bicarbonate or a sodium hydrogen sulfite solution, to neutralize any oxidizing agent that may remain at the conclusion of the reaction. This is highly preferred when the epoxidation is performed prior to the bromination; otherwise a significant amount of bromination can occur at allylic or tertiary carbon atoms, which reduces the thermal stability of the brominated and epoxidized organic compound.

The bromination and epoxidation reactions together preferably consume at least 90, more preferably at least 95 and still more preferably at least 98% of the non-conjugated carbon-carbon double bonds on the starting organic compound. Residual double bonds in the product can lead to undesirable cross-linking reactions, particularly when the product is blended with a bulk polymer for manufacture of extruded articles (foam, film, fiber, moldings etc.). The crosslinking may lead to gel formation and fouling of processing equipment. The presence of gels may lead to impaired physical properties, blemished surface or optical properties, or increased color formation. Gels may affect the ability to melt-process the blends, particularly when the blends are foamed.

The brominated and epoxidized organic compound of the invention is useful as a flame retardant for a variety of other polymers, which for convenience are referred to herein as the "bulk" polymer. The bulk polymers of most interest are thermoplastic materials that are processed into useful articles via a melt-processing operation. The bulk polymer therefore can be any thermoplastic polymer which is capable of being melt-processed at a temperature of 250° C. or below. The bulk polymer and the brominated and epoxidized organic compound should be selected together so that the brominated and epoxidized organic compound is compatible with the molten bulk polymer. A brominated and epoxidized organic compound is considered to be compatible with the bulk polymer for purposes of this invention if it is miscible in the bulk polymer at the relative proportions that are present, or if it can be dispersed within the bulk polymer to form finely dispersed domains. These domains preferably are mainly less than 25 microns and more preferably less than 10 microns in size, although some larger domains may be present. The formation of mainly macroscopic (~100 micron or greater in scale) domains of the brominated and epoxidized organic compound in the melt-processed product indicates such a lack of compatibility.

Thermoplastic polymers of interest as the bulk polymer include vinyl aromatic polymers (including vinyl aromatic homopolymers, vinyl aromatic copolymers, or blends of one or more vinyl aromatic homopolymers and/or vinyl aromatic copolymers), as well as other organic polymers in which the brominated and epoxidized organic compound is soluble or can be dispersed to form domains of predominantly less than 25 μm, preferably less than 10 μm, in size. Polymers and copolymers of styrene are preferred. Most preferred are polystyrene homopolymers and copolymers of styrene with ethylene, propylene, acrylic acid, maleic anhydride, and/or acrylonitrile. Polystyrene homopolymer is most preferred. Blends of any two or more of the foregoing polymers, or of one or more of the foregoing polymers with another resin, also can be used as the bulk polymer.

The bulk polymer should have a molecular weight high enough to allow for melt processing. Generally, a number average molecular weight of at least 10,000 is suitable.

The brominated and epoxidized organic compound is blended with the bulk polymer to form an organic polymer composition. Enough of the brominated and epoxidized organic compound is typically present to provide the organic polymer composition with a bromine content within a range of from 0.1 percent by weight to 25 percent by weight, based upon the total weight of the composition. A preferred bromine concentration in the organic polymer composition (provided by the FR additive) is from 0.25 to 10 percent by weight, a more preferred amount is from 0.5 to 5 weight percent, and a still more preferred amount is from 1 to 3 weight percent. The amount of the brominated and epoxidized organic compound that is needed to provide a given bromine content to the blend will of course depend at least in part on its bromine content. In general, however, as little as about 0.15 parts by weight of the brominated and epoxidized organic compound can be provided per 100 parts by weight bulk resin (pphr). At least 0.4 pphr or at least 0.8 pphr of the brominated and epoxidized organic compound can be provided. Up to 100 pphr of the brominated and epoxidized organic compound can be present in the blend, but a more preferred maximum amount is 50 pphr, a more preferred maximum amount is 20 pphr and a still more preferred maximum amount is 10 pphr or even 7.5 pphr.

In some embodiments, a blend of the brominated and epoxidized organic compound and bulk polymer also contains at least one alkyl phosphite compound. Suitable alkyl phosphites are described in "Plastic Additive Handbook", edited by H. Zweifel, 5th Ed., p. 441 (2001). The alkyl phosphite compound contains at least one

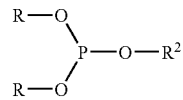

group, in which each R group is an unsubstituted or substituted alkyl group. The two R groups together may form a divalent group, which may be substituted, that bonds to the adjacent —O— atoms through an aliphatic carbon to form a ring structure that includes the —O—P—O— linkage. The R groups may be linear or branched. The carbon atom on the R groups that is adjacent to and bonded to the —O— atom is preferably a methylene (—CH$_2$—) carbon. Substituent groups on the R groups may be, for example, aryl, cycloalkyl,

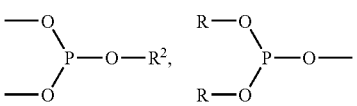

or an inert substituent. The R$^2$ group in the foregoing structures may be another R group, or an aryl or substituted aryl group.

A preferred type of R$^2$ group is an aryl group that is substituted with at least one branched alkyl group that contains a tertiary carbon atom. The branched alkyl group that contains a tertiary carbon atom may be further substituted with one or more aryl groups. Another preferred type of R$^2$ group is an alkyl group, which may be branched or linear, having from 2 to 30, preferably from 8 to 20, carbon atoms. Examples of suitable R$^2$ groups include dodecyl, tetradecyl, hexadecyl, octadecyl, 2,4-di-(t-butyl)-phenyl,

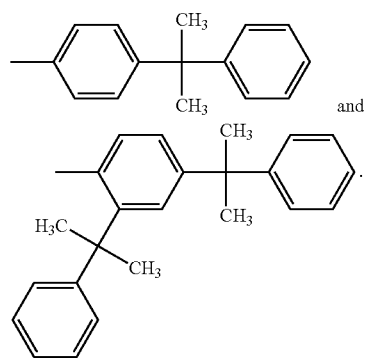

A preferred alkyl phosphite is a pentaerythritol diphosphite compound. These materials have the structure

Wherein each R$^3$ is an unsubstituted or substituted, linear or branched, alkyl group, an aryl group or a substituted aryl group.

Specific examples of preferred alkyl phosphites include bis(2,4-dicumylphenyl)pentaerythritol diphosphite, distearylpentaerythritol diphosphite and di(2,4-di-(t-butyl)phenyl)pentaerythritol diphosphite. These are commercially available as Doverphos™ S-9228 (Dover Chemical Corporation), Doverphos™ S-682 (Dover Chemical Corporation) and Irgafos™ 126 (Ciba Specialty Chemicals).

The alkyl phosphite compound preferably is soluble in the brominated and epoxidized organic polymer to the extent of at least 10, preferably at least 20, and more preferably to at least 40, parts of alkyl phosphite compound per 100 parts by weight of the brominated and epoxidized organic compound.

Other stabilizers and/or acid scavengers can be present, in addition to the alkyl phosphite and the epoxy compound. Examples of such materials include, for example, inorganic materials such as tetrasodium pyrophosphate, hydrocalumite, hydrotalcite and hydrotalcite-like clays; polyhydroxyl compounds having a molecular weight of 1000 or below, such as pentaerythritol, dipentaerythritol, glycerol, xylitol, sorbitol or mannitol, or partial esters thereof; and organotin stabilizers which may be allylophilic and/or dieneophilic. The organotin compounds include, for example, alkyl tin thioglycolates, alkyl tin mercaptopropionates, alkyl tin mercaptides, alkyl tin maleates and alkyl tin (alkylmaleates), wherein the alkyls are selected from methyl, butyl and octyl. Suitable organotin compounds are available commercially from Ferro Corporation (i.e., Thermchek™ 832, Thermchek™ 835), and Baerlocher GmbH (i.e., Baerostab™ OM 36, Baerostab™ M25, Baerstab™ MSO, Baerostab™ M63, Baerostab™ OM 710S).

It is generally preferable to use no greater than about 0.5 pphr, in the aggregate, of such inorganic materials, polyhydroxyl compound and organotin stabilizers, as these materials tend to plasticize the polymer and, in the case of a foamed material, can interfere with cell structure if used in too great a quantity. In particular, the amount of organotin stabilizer is preferably no greater than 0.5 pphr, and if present, preferably is present at a level of from 0.1 to 0.4 pphr. In some embodiments, these materials are absent from the composition.

Other, optional ingredients may be present as necessary or desired for the particular melt processing operation.

The organic polymer composition of the invention is typically melt processed to form useful articles. Melt processing, for purposes of this invention, involves creating a melt of the bulk polymer and the brominated and epoxidized organic compound, forming the melt into some shape, and then cooling the melt to solidify it and form an article. Various melt processing operations are within the scope of this invention, such as extrusion, injection molding, compression molding, casting, and the like. The melt processing operation of most interest is extrusion foaming. In each case, the melt processing operation can be conducted in any convenient manner. Apart from the presence of the brominated and epoxidized organic compound, the melt processing operations may be performed in an entirely conventional manner.

Other additives which may be present during the melt processing operation include, for example, lubricants such as barium stearate or zinc stearate; UV stabilizers, pigments, nucleating agents, plasticizers, FR synergists, IR blockers, and the like.

Extrusion foaming is performed by forming a pressurized melt that contains the bulk polymer, the brominated and epoxidized organic compound, a blowing agent and other additives such as may be useful. Once the raw materials have been mixed and the polymer melted, the resulting gel is forced through an opening into a zone of lower pressure, where the blowing agent expands and the polymer solidifies to form a foam. The extruded foam can take the form of a sheet (having a thickness of up to ½ inch (12 mm)), plank or boardstock (having a thickness of from % inch (12 mm) to 12 inches (30 cm) or more), or other convenient shape. The foam can be extruded to form coalesced strand foam if desired. The various raw materials can be fed into the processing equipment individually or in various combinations. A premix can be in the form of a dry blend of particles of the bulk polymer and particles of the brominated and epoxidized organic compound. Alternatively, or in addition, the bulk polymer and brominated and epoxidized organic compound can be melt-blended prior to the melt processing operation, and the molten mixture or particles of the blend can be introduced into the melt processing operation. It is generally preferred to introduce the blowing agent as a separate stream after the polymeric materials have been melted.

The blowing agent in an extrusion foaming process can be an exothermic (chemical) type or an endothermic (physical) type. Physical blowing agents such as carbon dioxide, various hydrocarbons, hydrofluorocarbons, water, alcohols, ethers and hydrochlorofluorocarbons are especially suitable.

The FR agent of the invention exhibits good thermal stability as a neat compound, as indicated by the 5% WLT test described before. A somewhat more stringent test of thermal stability is a 230° C. onset time test, which evaluates the amount of time a blend of the FR agent in a bulk polymer can withstand a temperature of 230° C. before measurable weight loss is seen. The FR agent is blended with a polystyrene homopolymer at proportions such that the blend contains 1.8% bromine. A sample is heated on a thermogravimetric analyzer to 230° C. and held at that temperature until the sample exhibits a measurable weight loss. The amount of time that elapses before a measurable weight loss is seen is the 230° C. onset time. The 230° onset time should be at least 7 minutes, and preferably is at least 9 minutes.

The article produced in the melt processing operation can be used in the same manner as similar articles made in other melt processing operations. When the article is a foam, the foam preferably has a density of up to 80 $kg/m^3$, more preferably up to 64 $kg/m^3$ and even more preferably up to 48 $kg/m^3$. Foam that is used as thermal insulation is preferably in the form of boardstock having a density of from 24 to 48 $kg/m^3$. Billet foam preferably has a density of from 24 to 64 $kg/m^3$, more preferably from 28 to 48 $kg/m^3$. The foams preferably have an average cell size in the range of from 0.1 mm to 4.0 mm, especially from 0.1 to 0.8 mm, per ASTM D3576. The foam may be predominantly closed-celled, i.e., may contain 30% or less, preferably 10% or less and even more preferably 5% or less of open cells, per ASTM D6226-05. More highly open-celled foams also may be produced in accordance with the invention.

Boardstock foams made in accordance with the invention are useful as building foam insulation, as part of roof or wall assemblies. Other foams made in accordance with the invention can be used as decorative billet, pipe insulation and in molded concrete foundation applications.

The following examples are provided to illustrate the invention, but not to limit the scope thereof. All parts and percentages are by weight unless otherwise indicated.

Example 1

A styrene-butadiene-styrene triblock copolymer containing 46% polymerized styrene and 54% polymerized butadiene is brominated and then epoxidized. Approximately 84% of the butadiene units in the starting triblock copolymer are 1,2-butadiene units; the remainder are mainly 1,4-butadiene units. 5.8 g of this copolymer are dissolved in 30 mL of 1,2-dichloroethane. A separate solution of tetraethylammonium tribromide is prepared by dissolving 7.2 g of bromine and 11.2 g of tetraethylammonium monobromide salt into 30 mL of 1,2-dichloroethane. The solutions are mixed together at room temperature for about an hour, and then left to stand undisturbed for about 2 days. Tetraethylammonium monobromide precipitates as the reaction proceeds. At the end of the reaction, the precipitate is filtered off, and the filtrate is rinsed with an additional 40 mL of 1,2-dichloroethane. The organic layer is then washed with 60 grams of a 1% aqueous sodium bisulfite solution and 60 grams of a 0.6% aqueous sodium bicarbonate solution. The polymer is precipitated by immersion into 400 mL of isopropanol. The resulting white polymer is collected by vacuum filtration and dried overnight in a 60° C. vacuum oven. 80% of the butadiene units, including essentially all of the 1,4-butadiene units, are brominated. This material has a 5% WLT of 245° C.

10 g of the brominated triblock copolymer is dissolved into 100 mL of 1,2-dichloroethane. 2.1 g of 70% meta-chloroperbenzoic acid are added. The resulting solution is stirred at room temperature for 5 days. The solution is then transferred to a separatory funnel and washed with two 30 mL aliquots of a saturated sodium bicarbonate solution and once with a 1% sodium bicarbonate solution. The polymer is then precipitated by immersion into 300 mL isopropanol, collected by filtration and dried overnight in a 60° C. vacuum oven. Per proton NMR, 73% of the starting butadiene units have been brominated, 22% have been epoxidized and about 5% remain. Essentially all of the epoxidation is of the terminal type. The 5% WLT of this material is 252° C., which is significantly higher than before the epoxidation reaction. About 0.8% of the bromine is bound to allylic or tertiary carbon atoms. The polymer contains about 46% bromine by weight.

Example 2

Example 1 is repeated, changing the reaction times slightly so that 80% of the starting butadiene units are brominated, 18% are epoxidized and about 2% remain unreacted. The epoxidation is essentially all of the terminal type. The 5% WLT for the brominated and epoxidized material is 254° C. About 1.8% of the bromine is bound to allylic or tertiary carbon atoms. The polymer contains about 54% bromine by weight.

Example 3

Example 1 is repeated again, changing the reaction times slightly so that 88% of the starting butadiene units are brominated, 7% are epoxidized and about 5% remain unreacted. The epoxidation is essentially all of the terminal type. The 5% WLT for the brominated and epoxidized material is 255° C. About 0.3% of the bromine is bound to allylic or tertiary carbon atoms. The polymer contains about 57% bromine by weight.

Example 4

5 grams of the triblock copolymer described in Example 1 are dissolved in 50 mL of 1,2-dichloroethane. The solution is cooled to 0° C. and 2.5 g of 70% meta-chloroperbenzoic acid is added. The mixture is stirred at 0° C. for 2 hours, turning cloudy as benzoic acid is produced. The solution is washed twice with 30 mL of a saturated aqueous sodium bicarbonate solution and once with 30 mL of a 1% sodium bisulfite solution. The epoxidized polymer is precipitated by immersion in 300 mL isopropanol, collected by vacuum filtration and dried overnight in a 60° C. vacuum oven. 21% of the starting butadiene units are epoxidized. The epoxidation occurs mainly at 1,4-butadiene units.

4.6 grams of the epoxidized triblock copolymer are dissolved in 30 mL 1,2-dichloroethane. A separate solution of tetraethylammonium tribromide is prepared by dissolving 5.6 g of bromine and 8.85 g of tetraethylammonium monobromide salt into 30 mL of 1,2-dichloroethane. The solutions are mixed together at room temperature for about an hour, and then left to stand undisturbed for about 2 days. Tetraethylammonium monobromide precipitates as the reaction proceeds. At the end of the reaction, the precipitate is filtered off, and the filtrate is rinsed with an additional 40 mL of 1,2-dichloroethane. The organic layer is then washed with 60 grams of a 1% aqueous sodium bisulfite solution and 60 grams of a 0.6% aqueous sodium bicarbonate solution. The polymer is precipitated by immersion into 400 mL of isopropanol. The resulting white polymer is collected by vacuum filtration and dried overnight in a 60° C. vacuum oven.

Per proton NMR, 77% of the starting butadiene units have been brominated, 21% have been epoxidized and about 2% remain. Essentially all of the epoxidation is of the internal type. The 5% WLT of this material is 245° C. About 0.1% of the bromine is bound to allylic or tertiary carbon atoms. The polymer contains about 53% bromine by weight.

Example 5

Example 4 is repeated, changing the reaction times slightly so that 69% of the starting butadiene units are brominated, 29% are epoxidized and about 2% remain unreacted. The epoxidation is essentially all of the internal type. The 5% WLT for the brominated and epoxidized material is 241° C. About 0.1% of the bromine is bound to allylic or tertiary carbon atoms. The polymer contains about 51% bromine by weight.

Example 6

Example 4 is repeated again, changing the reaction times slightly so that 83% of the starting butadiene units are brominated, 13% are epoxidized and about 4% remain unreacted. The epoxidation is essentially all of the internal type. The 5% WLT for the brominated and epoxidized material is 247° C. About 0.1% of the bromine is bound to allylic or tertiary carbon atoms. The polymer contains about 57% bromine by weight.

Evaluation of Examples 1-6

The brominated and epoxidized triblock copolymers of Examples 1-6 are separately blended into polystyrene. Polystyrene (Dow Chemical grade PS168) is added to the bowl of a Haake Polylab Rheomix 600 torque rheometer equipped with a 50 g mixing bowl and roller blade mixers. The bowl is preheated to 180° C.; the polystyrene is added under low RPM and a nitrogen pad. After mixing the polystyrene at 40 RPM and 180° C. for 2 minutes, the brominated and epoxidized triblock copolymer is added. Proportions of polystyrene and triblock copolymer are selected so that their combined weight is 50 grams, and the blend contains 1.8% by weight bromine. Mixing is continued for an additional 8 minutes under nitrogen at 180° C. Blends made using Examples 1-6 are respectively identified as Blends B1-B6.

A portion of each blend is separately heated to 230° C. on a thermogravimetric analyzer, and held at that temperature. The time at which the sample exhibits a measurable weight loss is determined as an indication of the thermal stability of the blend. Results are as indicated in Table 1.

TABLE 1

| Blend No. | % Bromination[1] | % Epoxidation[2] | Epoxidation Type | 230° Onset time, min. |
|---|---|---|---|---|
| B1 | 70 | 24 | Terminal | 19.3 |
| B2 | 80 | 18 | Terminal | 9.2 |
| B3 | 88 | 7 | Terminal | 9.9 |
| B4 | 69 | 29 | Internal | 7.2 |
| B5 | 77 | 21 | Internal | 7.2 |
| B6 | 83 | 13 | Internal | 7.7 |

[1]% of the butadiene units of the triblock copolymer that are brominated.
[2]% of the butadiene units of the triblock copolymer that are epoxidized.

The data in Table 1 (for blends B1-B3) indicates that when the epoxidation is of the terminal type, the 230° C. onset time correlates with the amount of epoxidation, at a constant bromine level in the blend. The onset times for blends B4-B6 are all lower, and are independent of the level of epoxidation. This is attributed to the presence of internal rather than terminal epoxidation. The internal epoxidation is believed to be less thermally stable than the terminal epoxidation that is present in blends B1-B3. Some of the internal epoxidation is believed to react under the blending conditions used to prepare blends B4-B6, resulting in the lower 230° C. onset times. This data supports a preference for terminal rather than internal epoxidation.

Example 7

10 grams of the triblock copolymer described in Example 1 are dissolved in 50 mL of 1,2-dichloroethane. The solution is cooled to 0° C. and 5.2 g of 70% meta-chloroperbenzoic acid is added. The mixture is stirred at 0° C. for 2 hours, turning cloudy as benzoic acid is produced. The solution is washed twice with 30 mL of a saturated aqueous sodium bicarbonate solution and once with 30 mL of a 1% sodium bisulfite solution. About 13% of the butadiene units are epoxidized in this manner. The epoxidation occurs mainly at 1,4-butadiene units.

A separate solution of tetraethylammonium tribromide is prepared by dissolving 6.6 g of bromine and 15.4 g of tetraethylammonium monobromide salt into 30 mL of 1,2-dichloroethane. The solutions are mixed together at room temperature for about an hour, and then left to stand undisturbed for about 2 days. Tetraethylammonium monobromide precipitates as the reaction proceeds. At the end of the reaction, the precipitate is filtered off, and the filtrate is rinsed with an additional 40 mL of 1,2-dichloroethane. The organic layer is then washed with 60 grams of a 1% aqueous sodium bisulfite solution and 60 grams of a 0.6% aqueous sodium bicarbonate solution. The polymer is precipitated by immersion into 500 mL of isopropanol. The resulting white polymer is collected by vacuum filtration and dried overnight in a 60° C. vacuum oven. Per proton NMR, 82% of the starting butadiene units have been brominated, 13% have been epoxidized and about 5% remain. Essentially all of the epoxidation is of the internal type. The 5% WLT of this material is 252° C. About 0.1% of the bromine is bound to allylic or tertiary carbon atoms. The polymer contains about 56% bromine by weight.

Example 8

10 grams of the triblock copolymer described in Example 1 are dissolved in 50 mL of 1,2-dichloroethane. The solution is cooled to 0° C. and 5.2 g of a 70% meta-chloroperbenzoic acid is added. The mixture is stirred at 0° C. for 2 hours, turning cloudy as benzoic acid is produced. The solution is washed twice with 30 mL of a saturated aqueous sodium bicarbonate solution and once with 30 mL of a 1% sodium bisulfite solution. About 16% of the butadiene units are epoxidized in this manner. The epoxidation occurs mainly at 1,4-butadiene units. A separate solution of tetraethylammonium tribromide is prepared by dissolving 1.3 g of bromine and 2.1 g of tetraethylammonium monobromide salt into 5 mL of 1,2-dichloroethane. The solutions are mixed together at room temperature for about an hour, and then left to stand undisturbed for about 2 days. Tetraethylammonium monobromide precipitates as the reaction proceeds. At the end of the reaction, the precipitate is filtered off, and the filtrate is rinsed with an additional 5 mL of 1,2-dichloroethane. The organic layer is then washed with 20 grams of a 1% aqueous sodium bisulfite solution and 20 grams of a 0.6% aqueous sodium bicarbonate solution. The polymer is precipitated by immersion into 75 mL of isopropanol. The resulting white polymer is collected by vacuum filtration and dried overnight in a 60° C. vacuum oven. Per proton NMR, 66% of the starting butadiene units have been brominated, 16% have been epoxidized and about 14% remain. Essentially all of the epoxidation is of the internal type. The 5% WLT of this material is only 239° C. About 4% of the bromine is bound to allylic or tertiary carbon atoms. The poorer 5% WLT of this sample is attributed to the high % of allylically and/or tertiary-bound bromine atoms. This experiment, together with Example 7, suggests that when bromination follows epoxidation, treatment with a base and/or reducing agent should precede the bromination.

Comparative Sample A 2 grams of the triblock starting material described in Example 1 are dissolved in 60 mL hexane. The solution is cooled to 0° C. and 0.8 g of 70% meta-chloroperbenzoic acid are added. The solution is stirred at 0° C. for 3 hours. 10 mL cyclohexane and 2 mL isopropanol are added and the mixture is heated to 68° C. under nitrogen. A solution of 2.56 g of bromine in 4 mL of cyclohexane is added dropwise over 10 minutes. The reaction mixture is then cooled and washed with 30 g of a 1% aqueous sodium bisulfite solution and 30 g of a 0.6% aqueous sodium bicarbonate solution. The polymer is then isolated by precipitation in 200 mL methanol, filtered and dried overnight in a 60° C. vacuum oven. 84% of the butadiene units are brominated, but none are epoxidized. This result is attributed to the bromination of oxirane rings by elemental bromine. The product also contains a large proportion of allylic and tertiary bromines. The 5% weight loss temperature is 243° C.

Example 9

Meta-chloroperbenzoic acid (70 wt %, 5.6 mmol, 1.4 g) is added to a 0° C. solution of 5 g of a sucrose/soybean fatty acid ester (Sefose®1618UC from P&G Chemicals) in 30 mL of dichloroethane. The solution is stirred at 0° C. for 3 hours during which time the solution turns cloudy with the production of benzoic acid. The solution is then transferred to a separatory funnel and washed twice with 50 mL of a saturated sodium bicarbonate solution, once with 50 mL of a 1% sodium bisulfite solution and once with 50 mL of a saturated sodium chloride solution. The dissolved epoxidized material is transferred to a 300 mL glass bottle. In a separate glass bottle, a solution of tetraethylammonium tribromide is prepared by adding 4.26 grams of tetraethyl ammonium bromide to 2.7 grams of bromine dissolved in 10 mL 1,2-dichloroethane. The bromine mixture is allowed to stand at least 30 minutes and then is added to the solution of epoxidized material. The resulting mixture is shaken for one hour and then left at ambient temperature for 19 hours. Tetraethylammonium monobromide salt precipitates as the bromination reaction proceeds. This precipitate is filtered and an additional 40 mL 1,2-dichloroethane is used to rinse the filtrate. The organic layer is collected and washed with 60 g of a 10% aqueous sodium bisulfite solution and 60 g 0.6% aqueous sodium bicarbonate solution. The organic phase is stripped on a rotary evaporator to give a cloudy colorless oil. The oil is rotated under vacuum on the rotary evaporator for 3 hours in a 60° C. water bath to remove residual solvent. By proton NMR, 25% of the carbon-carbon double bonds in the starting material have been epoxidized and 75% have been brominated. There are no residual olefins measurable by NMR. The 5% WLT of the product is 261° C. The product contains 35.3% by weight bromine.

Example 10

Meta-chloroperbenzoic acid (mCPBA, 70 wt %, 7.2 mmol, 1.8 g) is added to a 0° C. solution of 5 g of polybutadiene homopolymer in 50 mL of dichloroethane. The solution is stirred at 0° C. for 3 hours during which the solution turns cloudy with the production of benzoic acid. The solution is then transferred to a separatory funnel and washed twice with 50 mL of a saturated sodium bicarbonate solution, once with 50 mL of a 1% sodium bisulfite solution and with a saturated sodium chloride solution. The brominated polymer solution is transferred to a 300 mL glass bottle. To a separate glass bottle a solution of tetraethylammonium tribromide is prepared by adding 19.81 g of tetraethyl ammonium bromide to a solution of 12.55 g of bromine in 30 mL 1,2-dichloroethane. The bromine mixture is allowed to stand 30 minutes, and then is added to the brominated rubber solution. The resulting mixture is shaken for one hour and then allowed to stand 2 days at room temperature. Tetraethylammonium monobromide salt precipitates as the bromination reaction proceeds. This precipitate is filtered and an additional 40 mL 1,2-dichloroethane is used to rinse the filtrate. The organic layer is collected and washed with 60 g of a 1% aqueous sodium bisulfite solution and 60 g of a 0.6% aqueous sodium bicarbonate solution. The polymer was isolated by precipitation from 500 mL isopropanol. White polymer was collected via vacuum filtration and dried in a vacuum oven at 60° C. overnight. By proton NMR, 7% of the carbon-carbon double bonds in the starting material have been epoxidized and 88% have been brominated. Because the epoxidation reaction is performed first, the epoxide groups are mainly the internal type. 5% of the butadiene units in the starting polymer remain. The 5% WLT of the product is 240° C. The product contains 72.7% by weight bromine. Less than 0.1% of the bromine is bound to allylic or tertiary carbon atoms.

Example 11

4.8 grams of a 2000 molecular weight butadiene homopolymer is dissolved in 30 mL 1,2-dichloroethane in a 300 mL glass bottle. To a separate glass bottle a solution of tetraethylammonium tribromide is prepared by adding 19.01 g of tetraethyl ammonium bromide to a solution of 12.05 g of bromine in 30 mL 1,2-dichloroethane. The bromine mixture is allowed to stand 30 minutes, and then is added to the rubber solution. The resulting mixture is shaken for one hour and then allowed to stand 2 days at room temperature. Tetraethylammonium monobromide salt precipitates as the bromination reaction proceeds. This precipitate is filtered and an additional 40 mL 1,2-dichloroethane is used to rinse the filtrate. The organic layer is collected and washed with 60 g of 1% aqueous sodium bisulfite solution and 60 g of 0.6% aqueous sodium bicarbonate solution.

The brominated polymer solution is placed in a 250 mL round bottom flask and meta-chloroperbenzoic acid (70 wt %, 13.3 mmol, 3.3 g) is added. The solution is stirred at room temperature for 2 days, during which the solution turns cloudy with the production of benzoic acid. The solution is then transferred to a separatory funnel and washed with 80 mL of a saturated sodium bicarbonate solution, 50 ml of a saturated sodium chloride solution and 50 mL of a 1% sodium bisulfite solution. The brominated and epoxidized polymer is isolated by precipitation from 500 mL isopropanol. The polymer is collected via vacuum filtration and dried in a vacuum oven at 60° C. overnight. By proton NMR, 16% of the carbon-carbon double bonds in the starting material have been epoxidized and 78% have been brominated. Because the epoxidation reaction is performed last, the epoxide groups are mainly the terminal type. 6% of the butadiene units in the starting polymer remain. The 5% WLT of the product is 250° C. The product contains 69.1% by weight bromine. About 0.1% of the bromine is bound to allylic or tertiary carbon atoms.

What is claimed is:

1. A brominated and epoxidized organic compound having a molecular weight of at least 1500, a bromine content of at least 35% by weight and at least one oxirane group per molecule, and which has a 5% weight loss temperature of at least 180° C., wherein the brominated and epoxidized organic compound is a brominated and epoxidized homopolymer or copolymer of butadiene or a brominated and epoxidized ester of a polyol and one or more fatty acids.

2. The brominated and epoxidized organic compound of claim 1, wherein at least one of the oxirane group(s) is terminal.

3. A process for preparing a brominated and epoxidized organic compound of claim 1, comprising (a) brominating a starting compound that has a molecular weight of at least 700 and multiple non-conjugated carbon-carbon double bonds such at least one but less than all of the non-conjugated carbon-carbon double bonds are brominated and the brominated starting compound contains at least 35% by weight bromine, and then (b) epoxidizing at least one remaining non-conjugated carbon-carbon double bond.

4. The process of claim 3, wherein the starting compound is a homopolymer or copolymer of butadiene.

5. The process of claim 3, wherein the starting compound is an ester of a polyol and one or more fatty acids.

6. The process of claim 3, wherein said at least one remaining non-conjugated carbon-carbon double bond is terminal.

7. A process for preparing a brominated and epoxidized organic compound of claim 1, comprising (a) epoxidizing a starting compound that has a molecular weight of at least 700 and multiple non-conjugated carbon-carbon double bonds such at least one but less than all of the non-conjugated carbon-carbon double bonds is epoxidized and then (b) brominating at least a portion of the remaining non-conjugated carbon-carbon double bonds by contacting the compound with a quaternary ammonium tribromide or quaternary phosphonium tribromide, to produce an brominated and epoxidized organic compound that has a molecular weight of at least 1500 and contains at least 35% by weight bromine.

8. The process of claim 7, wherein the starting compound is a homopolymer or copolymer of butadiene.

9. The process of claim 7, wherein the starting compound is an ester of a polyol and one or more fatty acids.

10. A process for preparing a brominated and epoxidized organic compound of claim 1, comprising includes (a) brominating a starting unsaturated compound that contains both internal non-conjugated carbon-carbon double bonds and terminal non-conjugated carbon-carbon double bonds until at least 90% of the internal carbon-carbon double bonds are brominated but no more than 90% of the terminal carbon-carbon double bonds are brominated and (b) epoxidizing at least a portion of the remaining terminal carbon-carbon double bonds, to provide a brominated and epoxidized organic compound that contains at least 35% by weight bromine and from 0.1 to 5 weight percent of oxirane oxygen.

11. The process of claim 10, wherein the starting compound is a homopolymer or copolymer of butadiene.

12. The process of claim 10, wherein step (a) is conducted by contacting the starting compound with a quaternary ammonium tribromide or a quaternary phosphonium tribromide.

13. The process of claim 10, wherein step (b) is conducted by contacting the brominated starting compound with meta-chloroperbenzoic acid.

14. A process for preparing a brominated and epoxidized butadiene polymer, comprising (a) brominating a starting butadiene polymer having a molecular weight of at least 700 and which has both 1,4-butadiene units and 1,2-butadiene units, such that at least 90% of the 1,4-butadiene units are brominated and at most 90% of the 1,2-butadiene units are brominated; and then (b) epoxidizing at least one of the remaining unbrominated 1,2-butadiene units to form a brominated and epoxidized butadiene polymer.

15. The process of claim 14, wherein step (a) is conducted by contacting the starting compound with a quaternary ammonium tribromide or a quaternary phosphonium tribromide.

16. The process of claim 14, wherein step (b) is conducted by contacting the brominated starting compound with meta-chloroperbenzoic acid.

17. An organic polymer composition comprising an organic polymer having dissolved or dispersed therein an amount of the brominated and epoxidized organic compound of claim 1 sufficient to impart to the composition at least 0.1 part by weight of bromine per 100 parts by weight of the organic polymer composition.

\* \* \* \* \*